United States Patent
Harada et al.

(10) Patent No.: US 10,785,061 B2
(45) Date of Patent: Sep. 22, 2020

(54) PROPAGATION CHANNEL ESTIMATION METHOD

(71) Applicant: KYOTO UNIVERSITY, Kyoto (JP)

(72) Inventors: Hiroshi Harada, Kyoto (JP); Keiichi Mizutani, Kyoto (JP); Kiminobu Makino, Kyoto (JP)

(73) Assignee: KYOTO UNIVERSITY, Kyoto (JP)

( * ) Notice: Subject to any disclaimer, the term of this patent is extended or adjusted under 35 U.S.C. 154(b) by 339 days.

(21) Appl. No.: 16/061,577

(22) PCT Filed: Dec. 15, 2016

(86) PCT No.: PCT/JP2016/005145
§ 371 (c)(1),
(2) Date: Jun. 12, 2018

(87) PCT Pub. No.: WO2017/104139
PCT Pub. Date: Jun. 22, 2017

(65) Prior Publication Data
US 2020/0267027 A1 Aug. 20, 2020

(30) Foreign Application Priority Data
Dec. 16, 2015 (JP) .................... 2015-245290

(51) Int. Cl.
H04L 25/02 (2006.01)
H04L 27/26 (2006.01)
(52) U.S. Cl.
CPC ...... H04L 25/0228 (2013.01); H04L 27/2601 (2013.01)
(58) Field of Classification Search
None
See application file for complete search history.

(56) References Cited

U.S. PATENT DOCUMENTS

2006/0013326 A1* 1/2006 Yoshida .............. H04L 25/0218
375/260
2007/0004437 A1* 1/2007 Harada ................... H04L 5/023
455/506

(Continued)

FOREIGN PATENT DOCUMENTS

JP 2009-088771 A 4/2009
JP 2011-019057 A 1/2011

(Continued)

OTHER PUBLICATIONS

Coleri et al., Channel Estimation Techniques Based on Pilot Arrangement in OFDM Systems, IEEE Transactions on Broadcasting, Sep. 2002, pp. 223-229, vol. 48, No. 3, IEEE.

(Continued)

*Primary Examiner* — Ajit Patel
(74) *Attorney, Agent, or Firm* — Paratus Law Group, PLLC

(57) ABSTRACT

A propagation channel estimation method is provided. In-phase and quadrature components of a propagation channel estimation value in each pilot subcarrier are separated into amplitude and phase components. A propagation channel of a data subcarrier portion existing between pilot subcarriers is estimated by phase/amplitude separation linear interpolating in each separated amplitude and phase component. A reference parameter is produced by linear interpolating a portion between pilot subcarriers on a complex plane. When quadrants on the complex plane of the interpolated phase component estimation value and the reference parameter are different, a phase connecting process to cancel a discontinuity of the phases is executed to the phase component estimation value interpolated by the phase/amplitude separation linear interpolation. When the quadrants are not different or after the phase connecting process, a complex propagation channel estimation value of the data subcarrier (Continued)

portion is calculated from the phase and amplitude components of the propagation channel estimation value.

2 Claims, 2 Drawing Sheets

(56) References Cited

U.S. PATENT DOCUMENTS

| | | | |
|---|---|---|---|
| 2011/0038430 A1* | 2/2011 | Yoshimoto | H04L 5/0046 375/259 |
| 2011/0064036 A1* | 3/2011 | Tsai | H04L 1/06 370/329 |
| 2012/0020437 A1 | 1/2012 | Furudate | |
| 2015/0208427 A1 | 7/2015 | Furudate et al. | |

FOREIGN PATENT DOCUMENTS

| | | |
|---|---|---|
| JP | 2012-028922 A | 2/2012 |
| JP | 2015-136026 A | 7/2015 |

OTHER PUBLICATIONS

Ho et al., Uplink Channel Estimation in WiMAX, Wireless Communications and Networking Conference (WCNC), Apr. 5-8, 2009, pp. 1-6, IEEE, Budapest, Hungary.

Makino et al., Receiver design for VHF broadband mobile communication systems, Technical Report of IEICE, Mar. 2015, pp. 1-6, IEICE.

Mar. 7, 2017, International Search Report issued for related PCT application No. PCT/JP2016/005145.

Mar. 7, 2017, International Search Opinion issued for related PCT application No. PCT/JP2016/005145.

Lee et al., Noise Reduction for Channel Estimation Based on Pilot-Block Averaging in DVB-T Receivers, IEEE Transactions on Consumer Electronics, Mar. 13, 2006, pp. 51-58, vol. 52, Issue 1, IEEE.

* cited by examiner

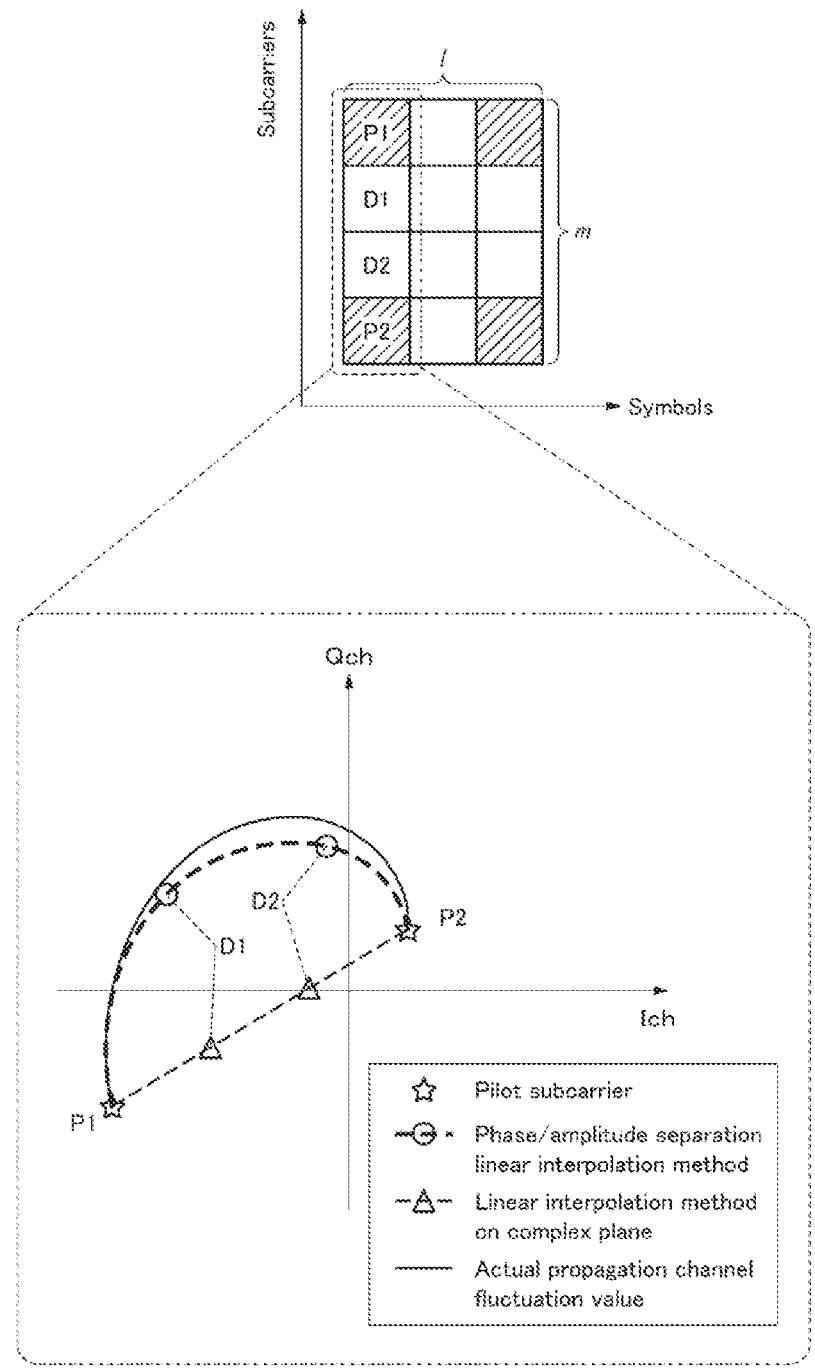
[ Fig. 1 ]

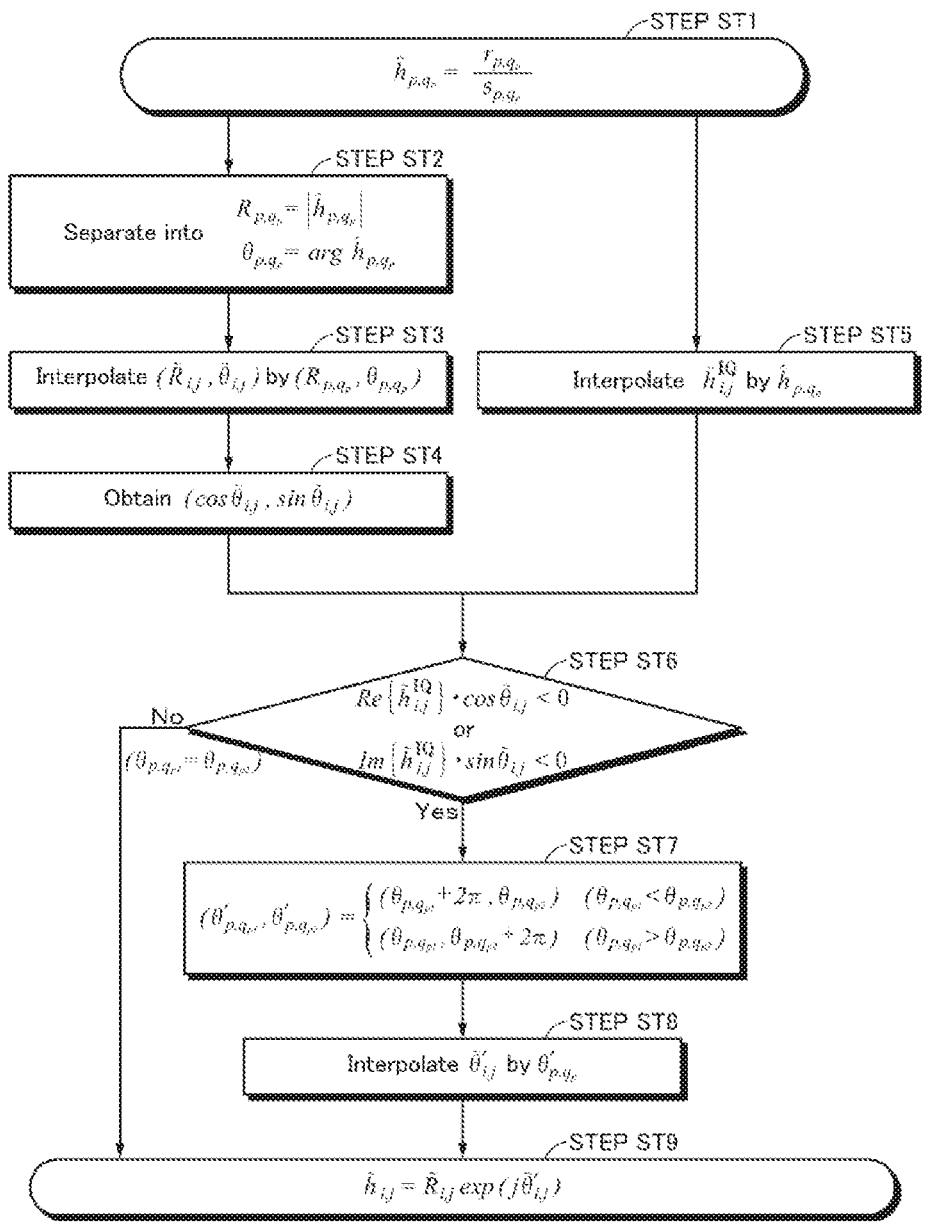
[ *Fig. 2* ]

PROPAGATION CHANNEL ESTIMATION METHOD

CROSS REFERENCE TO PRIOR APPLICATION

This application is a National Stage Patent Application of PCT International Patent Application No. PCT/JP2016/005145 (filed on Dec. 15, 2016) under 35 U.S.C. § 371, which claims priority to Japanese Patent Application No. 2015-245290 (filed on Dec. 16, 2015), which are all hereby incorporated by reference in their entirety.

TECHNICAL FIELD

The present invention relates to a propagation channel estimation method.

BACKGROUND ART

In a very severe fading propagation channel, there is such a problem that a propagation channel estimation error due to a pilot signal is large and reception quality deteriorates. Radio waves transmitted by radio communication are reflected, scattered, and diffracted by various propagation environments and are received. The fading is such a phenomenon that radio waves which passed through various propagation channels are interfered, so that received power fluctuates. Since the received power fluctuates due to a change in propagation channel, particularly, in the case where an object moved at a high speed or the like, the received power has a severe time fluctuation.

When communication is performed in a propagation environment having a long delay in a wide band, since phases of delay components differ in dependence on frequencies, a difference between a strengthening degree and a weakening degree occurs. Such a phenomenon is called frequency selectivity of the fading and becomes a strengthening/weakening difference depending on a delay time of each delayed wave and its relative received power. When communication of a long distance is performed, since a maximum delay time of the delayed waves becomes long, particularly, the frequency selectivity is enhanced.

As a system in which communication can be performed at a relatively high efficiency even under such an environment, an OFDM (Orthogonal Frequency Division Multiplexing) based system has been known. According to such a system, information symbols expressed by complex numbers are allocated to a plurality of frequency subcarriers which cross orthogonally and are not interfered with one another, and by adding each subcarrier signal on a time domain, one OFDM symbol is formed. Generally, such an operation can be realized by executing an inverse-Fourier transforming operation to the complex number information symbols contained in one OFDM symbol.

As mentioned above, on the receiver side, since the signal influenced by the fading reaches, in order to correctly perform a demodulation, it is necessary that an influence of the fading propagation channel is properly estimated in each subcarrier and is compensated (equalized). Generally, since a band width of each subcarrier has been set to such a small value that the frequency selectivity in the subcarrier can be ignored, the foregoing compensation can be performed by considering only the frequency selectivity between the subcarriers.

In a system such as WiMAX (Worldwide Interoperability for Microwave Access), LTE (Long Term Evolution), or the like as a representative communication system using OFDM, such a system that a partial subcarrier is used as a pilot subcarrier as a known signal in both of the transmitter and the receiver and a data transmission is performed by using the remaining subcarriers is used.

In those systems, generally, a propagation channel estimation of a pilot subcarrier is performed, a propagation channel estimation of a data subcarrier is performed on the basis of its estimation value, and an equalization is performed. When the propagation channel estimation is performed from the estimation value of the pilot subcarrier, in the related art, a system in which a linear interpolation is performed on a complex plane has generally been used. For example, a general propagation channel estimation system of OFDM is disclosed in Non Patent Literature 1. A propagation channel estimation system by the linear interpolation in UL of WiMAX is disclosed in Non Patent Literature 2.

Further, since the analog broadcasting has been shifted to the digital broadcasting in recent years, a band from 170 MHz to 202.5 MHz (hereinbelow, referred to as a 200 MHz band) as a part of a VHF band is allocated to the broadband customer owned and maintained communication by a report of the Information Communication Council of June, 2007, and its technical reference has been specified. As a standard specification of a transmitter corresponding to such a technical reference, STD-T103 has been specified and completed by ARIB. There are two operation modes in STD-T103 and one of them is Model in which fundamental parameters of IEEE802.16-2009[3] known as WiMAX is applied as it is to the VHF band, and a proposal of its receiver construction and an evaluation of characteristics in the VHF band mobile communication environment have been performed so far (refer to Non Patent Literature 3).

CITATION LIST

Non Patent Literature

[NPL 1] S. Coleri, M. Ergen, A. Puri, and A. Bahai, "Channel estimation techniques based on pilot arrangement in OFDM system", IEEE Trans., Vol. 48, No. 3, Sep. 2002

[NPL 2] K. Ho and A. Kwasinski, "Uplink Channel Estimation in WiMAX", Proc. WCNC 2009, pp. 1-6, April 2009

[NPL 3] MAKINO Kiminobu, MIZUTANI Keiichi, and HARADA Hiroshi, "Examination regarding receiver setting of VHF band broadband mobile communication system", Singaku Report, R C S 2014-333, pp. 189-194, March 2015

SUMMARY OF INVENTION

Technical Problem

According to the propagation channel estimation method proposed above, in the fading propagation channel having the strong frequency selectivity or time-dependent fluctuation, there is such a problem that the amplitude fluctuation amount is underestimated and its estimation error increases. This is because the amplitude fluctuation amount due to the actual fading is not a linear transition on the complex plane.

Further, although the equalization is performed by multiplying the reception signal by the reciprocal number of the complex fluctuation amount of the estimated propagation channel, according to the propagation channel estimation method in the related art, as mentioned above, when the amplitude fluctuation amount is underestimated, the fading is compensated to a value which is extremely larger than the value which should inherently be compensated and the reception quality deteriorates. When the estimation error is large, there is such a problem that it is difficult to accomplish the good reception quality even if another error correction technique or the like is used.

It is, therefore, an object of the invention to provide a propagation channel estimation method which can suppress an estimation error of a propagation channel and improve reception quality.

Solution to Problem

To solve the foregoing problem, according to the invention, there is provided a propagation channel estimation method using pilot subcarriers inserted into an OFDM signal, comprising the steps of:

separating an in-phase component and an quadrature component of a propagation channel estimation value in each of the pilot subcarriers into an amplitude component and a phase component and estimating a propagation channel of a data subcarrier portion existing between the pilot subcarriers by phase/amplitude separation linear interpolating in each of the separated amplitude component and phase component;

producing a reference parameter for assisting the propagation channel estimation of the data subcarrier portion between the pilot subcarriers by linear interpolating a portion between the pilot subcarriers on a complex plane;

discriminating whether or not quadrants on the complex plane of the phase component estimation value interpolated by the phase/amplitude separation linear interpolation and the reference parameter are different;

if it is determined that the quadrants are different, executing a phase connecting process for cancelling a discontinuity of the phases to the phase component estimation value interpolated by the phase/amplitude separation linear interpolation; and if it is determined that the quadrants are not different or after the phase connecting process, calculating a complex propagation channel estimation value of the data subcarrier portion from the phase component and the amplitude component of the propagation channel estimation value of the interpolated data subcarrier portion between the pilot subcarriers.

Advantageous Effects of Invention

According to at least one embodiment, the estimation error of the severe fading propagation channel is suppressed and the reception quality can be improved. The effects disclosed here are not always limited but may be any one of the effects disclosed in the present invention. The contents of the invention are not limitedly interpreted by the effects shown as an example in the following description.

BRIEF DESCRIPTION OF DRAWINGS

FIG. 1 Schematic diagram for use in an explanation of an interpolation method.

FIG. 2 Flowchart for use in the explanation of the interpolation method.

DESCRIPTION OF EMBODIMENTS

Embodiments of the invention will be described hereinbelow. The embodiments which will be described hereinbelow are exemplary specific examples of the invention and various kinds of limitations which are technically preferred are added. However, it is assumed that the scope of the invention is not limited to those embodiments unless otherwise described to limit the invention in the following explanation.

As a construction of a receiver at the time of embodying the invention, a construction similar to that disclosed in foregoing NPL 3 is used. In order to demodulate a reception signal in the receiver, a pilot signal is inserted. For example, in DL, a pilot arrangement of IEEE 802. 16-2009[3] Mode1 is a pilot arrangement of a structure in which a partial data subcarrier is sandwiched by four pilot signals, and in UL, it is a pilot arrangement of a tile structure in which all of the data subcarriers are sandwiched by four pilot signals. In DL, a pilot arrangement of Mode2 has such a form that a tile is constructed by 4 symbols and 4 subcarriers and pilot subcarriers are inserted to its four corners. In UL, it has such a form that pilot subcarriers are inserted to four corners of a tile of 7 symbols and 4 subcarriers. On the reception side, by obtaining a propagation channel estimation value of each of the known pilot subcarriers, a propagation channel of a data portion sandwiched by the pilot subcarriers is interpolation estimated.

Since the pilot subcarriers have been inserted in the signal like a foregoing example, a propagation channel fluctuation of the data subcarrier in which no pilot subcarrier is inserted is estimated. After that, by multiplying the reception signal every subcarrier by a reciprocal number of the estimated propagation channel fluctuation, an equalization is performed. As an actual interpolation method, an interpolation is performed every tile. Order of the interpolation may be set to either a subcarrier domain or an OFDM symbol domain and does not limit the invention.

An image of the interpolation method which is performed by the pilot subcarriers is shown in FIG. 1. In FIG. 1, an asterisk mark indicates a pilot subcarrier. A broken line indicates the linear interpolation method on a complex plane in the related art. A solid line indicates the phase/amplitude separation linear interpolation method according to the invention. Any one of a display of a form in which the propagation channel estimation value is separated into an in-phase component (Ich) and an quadrature component (Qch) and a complex number display in which a value obtained by multiplying Qch by j is added to Ich as will be mentioned hereinbelow can be used.

An assumption will be described. Now, assuming that a propagation channel fluctuation value in the jth subcarrier of the ith OFDM symbol is equal to $h_{i,j}$, a transmission signal is equal to $s_{i,j}$, and a noise is equal to $n_{i,j}$, a reception signal $r_{i,j}$ is shown by the following equation (1).

[Math. 1]

$$r_{i,j}=h_{i,j}s_{i,j}+n_{i,j} \tag{1}$$

Now, assuming that a number of a symbol in which a pilot subcarrier has been inserted is equal to p and a number of an inserted subcarrier in such a symbol is equal to $q_p$, information which can be obtained by the receiver side is a reception signal $r_{p,q_p}$ in the pilot subcarrier, a transmission signal $S_{p,q_p}$, and the reception signal $r_{i,j}$ in the data subcarrier. A propagation channel fluctuation value in the data subcarrier is estimated on the basis of the transmission/reception signals in the pilot subcarrier. After the estimation, a series of estimation, which will be described hereinafter, is performed in order to equalize to the transmission signal in the data subcarrier.

An embodiment of the interpolation method of the invention will be described with reference to a flowchart of FIG. 2.

Step ST1: A propagation channel estimation value in the pilot subcarrier is expressed by the following equation (2) from the reception signal $r_{p,qp}$ in the pilot subcarrier and the transmission signal $s_{p,qp}$.

[Math. 2]

$$\hat{h}_{p,q_p} = \frac{r_{p,q_p}}{s_{p,q_p}} \tag{2}$$

Step ST2: The propagation channel estimation value in the pilot subcarrier is separated into an estimated amplitude fluctuation value $R_{p,qp}$ and an estimated phase fluctuation value $\theta_{p,qp}$. They are expressed by the following equations (3).

[Math. 3]

$$R_{p,q_p} = |\hat{h}_{p,q_p}|, \theta_{p,q_p} = \arg \hat{h}_{p,q_p} \tag{3}$$

Step ST3: By interpolating the estimated amplitude fluctuation value and the estimated phase fluctuation value in the pilot subcarrier, an amplitude fluctuation value and a phase fluctuation value in the data subcarrier are estimated. When the tile structure is l symbols and m subcarriers, it is assumed that $i_m = i \bmod l$, $i_f = \text{floor}(i/l) \times l$, $j_m = j \bmod m$, and $j_f = \text{floor}(j/m) \times m$. Now, when an attention is paid to one tile, since it is separated into four kinds of $(p, q_p) = (1+i_f, 1+j_f)$, $(1+i_f, m+j_f)$, $(l+i_f, 1+j_f)$, and $(l+i_f, m+j_f)$, the estimated amplitude fluctuation value and the estimated phase fluctuation value are expressed by the following equations (4) and (5).

[Math. 4]

$$\tilde{R}_{i,j} = \frac{1}{(l-1)(m-1)} \tag{4}$$
$$\{(l-1-i_m)(m-1-j_m)R_{1+i_f,1+j_f} + mi_m lj_m R_{l+i_f,m+j_f} +$$
$$mi_m(m-1-j_m)R_{1+i_f,1+j_f} + (l-1-i_m)lj_m R_{1+i_f,1+j_f}\}$$

[Math. 2]

$$\tilde{\theta}_{i,j} = \tag{5}$$
$$\frac{1}{(l-1)(m-1)}\{(l-1-i_m)(m-1-j_m)\theta_{1+i_f,1+j_f} + mi_m lj_m \theta_{l+i_f,m+j_f} +$$
$$mi_m(m-1-j_m)\theta_{1+i_f,1+j_f} + (l-1-i_m)lj_m \theta_{1+i_f,1+j_f}\}$$

Step ST4: By the estimated phase fluctuation value in the data subcarrier, a direction vector of the phase/amplitude separation linear interpolation propagation channel estimation value in the data subcarrier is calculated.

[Math. 5]

$(\cos\tilde{\theta}_{i,j}, \sin\tilde{\theta}_{i,j})$ is obtained from $\tilde{\theta}_{i,j}$ Step ST5: As shown in the following equation (6), by performing the linear interpolation (method in the related art) on the complex plane to the propagation channel estimation value in the pilot subcarrier, a propagation channel estimation value in the data subcarrier is obtained and is set to a reference parameter.

[Math. 6]

$$\tilde{h}_{i,j}^{IQ} = \tag{6}$$
$$\frac{1}{(l-1)(m-1)}\{(l-1-i_m)(m-1-j_m)\tilde{h}_{1+i_f,1+j_f} + mi_m lj_m \tilde{h}_{l+i_f,m+j_f} +$$
$$mi_m(m-1-j_m)\tilde{h}_{1+i_f,1+j_f} + (l-1-i_m)lj_m \tilde{h}_{1+i_f,1+j_f}\}$$

Step ST6: The Ich component and Qch component of the data subcarrier propagation channel estimation value (reference parameter) by the linear interpolation on the complex plane are compared with the direction vector of the data subcarrier propagation channel estimation value by the phase/amplitude separation linear interpolation, thereby discriminating whether or not the quadrants coincide (whether or not the phase connection is necessary) (expressions 7).

[Math. 7]

$$\text{Re}\{\tilde{h}_{i,j}^{IQ}\} \cdot \cos\tilde{\theta}_{i,j} < 0 \tag{7}$$
$$\text{Im}\{\tilde{h}_{i,j}^{IQ}\} \cdot \cos\tilde{\theta}_{i,j} < 0$$

Step ST7: If it is determined in step ST6 that the quadrants are different, the phase connection is cancelled by adding 2π to a smaller one of the values as shown in the following equation.

[Math. 8]

$$(\theta'_{p,q_{p1}}, \theta'_{p,q_{p2}}) = \begin{cases} (\theta_{p,q_{p1}} + 2\pi, \theta_{p,q_{p2}}) & (\theta_{p,q_{p1}} < \theta_{p,q_{p2}}) \\ (\theta_{p,q_{p1}}, \theta_{p,q_{p2}} + 2\pi) & (\theta_{p,q_{p1}} > \theta_{p,q_{p2}}) \end{cases} \tag{8}$$

Step ST8: Only the phase interpolation in the phase/amplitude separation linear interpolation method is performed again as follows. An interpolating process (equation 9) of step ST9 is executed after step ST8.

[Math. 2]

$$\tilde{\theta}'_{i,j} = \tag{9}$$
$$\frac{1}{(l-1)(m-1)}\{(l-1-i_m)(m-1-j_m)\theta'_{1+i_f,1+j_f} + mi_m lj_m \theta'_{l+i_f,m+j_f} +$$
$$mi_m(m-1-j_m)\theta'_{1+i_f,1+j_f} + (l-1-i_m)lj_m \theta'_{1+i_f,1+j_f}\}$$

Step ST9: A data subcarrier propagation channel estimation value by the final phase/amplitude separation linear interpolation is calculated by the estimated amplitude fluctuation value and the estimated phase fluctuation value after the phase connection as shown by the following equation (10). Even if it is determined in step ST6 that the quadrants are not different, the process of step ST9 is executed.

[Math. 10]

$$\tilde{h}_{i,j} = \tilde{R}_{i,j} \exp(j\tilde{\theta}'_{i,j}) \tag{10}$$

The actual propagation channel fluctuation does not linearly fluctuate on the complex plane but the fluctuation occurs in each of the phase and the amplitude. Therefore, as a result of the foregoing process, by performing the equalization by using the phase/amplitude separation linear interpolation method according to the invention, the more actual propagation channel fluctuation can be interpolation traced as compared with the case of using only the linear interpolation on the complex plane as a method in the related art. Thus, the propagation channel estimation error can be further suppressed and even in the severe fading propagation channel as mentioned above, the good reception quality can be accomplished.

Although the embodiments of the invention have specifically been described above, the invention is not limited to the foregoing embodiments but various modifications based on the technical idea of the invention are possible.

REFERENCE SIGNS LIST

ST1~ST9 . . . Steps of propagation channel estimation method

The invention claimed is:

1. A propagation channel estimation method using pilot subcarriers inserted into an OFDM signal, comprising the steps of:

separating an in-phase component and a quadrature component of a propagation channel estimation value in each of the pilot subcarriers into an amplitude component and a phase component and estimating a propagation channel of a data subcarrier portion existing between the pilot subcarriers by phase/amplitude separation linear interpolating in each of the separated amplitude component and phase component;

producing a reference parameter for assisting the propagation channel estimation of the data subcarrier portion between the pilot subcarriers by linear interpolating a portion between the pilot subcarriers on a complex plane;

discriminating whether or not quadrants on the complex plane of the phase component estimation value interpolated by the phase/amplitude separation linear interpolation and the reference parameter are different;

if it is determined that the quadrants are different, executing a phase connecting process for cancelling a discontinuity of the phases to the phase component estimation value interpolated by the phase/amplitude separation linear interpolation; and if it is determined that the quadrants are not different or after the phase connecting process, calculating a complex propagation channel estimation value of the data subcarrier portion from the phase component and the amplitude component of the propagation channel estimation value of the interpolated data subcarrier portion between the pilot subcarriers.

2. A propagation channel estimation method according to claim 1, wherein the pilot subcarriers are arranged at predetermined intervals in each of a symbol domain and a subcarrier domain of the OFDM signal or are arranged at predetermined positions.

* * * * *